United States Patent [19]
Limburg et al.

[11] 3,970,602
[45] July 20, 1976

[54] COPOLYMERS OF N-VINYLCARBAZOLE AND N-VINYLPHTHALIMIDE AND DERIVATIVES THEREOF

[76] Inventors: William W. Limburg, 66 Clearview Drive, Penfield, N.Y. 14526; Donald A. Seanor, 264 Garnsey Road, Pittsford, N.Y. 14534

[22] Filed: Oct. 23, 1974

[21] Appl. No.: 517,122

Related U.S. Application Data

[62] Division of Ser. No. 342,646, March 19, 1973, Pat. No. 3,877,936.

[52] U.S. Cl. ............................ 260/78.41; 526/260; 526/263; 526/291; 526/296; 526/310
[51] Int. Cl.² .................. C08G 63/68; C08F 126/12
[58] Field of Search .................. 260/88.3 R, 78.4 D, 260/78.5 T, 80.3 R; 450/725, 612, 618

[56] References Cited
UNITED STATES PATENTS

| | | |
|---|---|---|
| 3,042,517 | 7/1962 | Wainer .......................... 260/88.3 R |
| 3,418,116 | 12/1968 | Inomi et al. ............................ 96/1.5 |
| 3,697,264 | 10/1972 | Podbajny .............................. 96/1.5 |
| 3,850,629 | 11/1974 | Ogo et al. ....................... 260/88.3 R |
| 3,893,853 | 7/1975 | Nukina et al. ...................... 260/88.3 |

*Primary Examiner*—Joseph L. Schofer
*Assistant Examiner*—Maria S. Tungol
*Attorney, Agent, or Firm*—James J. Ralabate; James Paul O'Sullivan; John H. Faro

[57] ABSTRACT

Polymeric compositions comprising the product of the addition polymerization of N-vinylcarbazole and at least one member selected from the group consisting of N-vinylphthalimide and the isostructural modifications thereof. Many of the above polymeric products are photoconductive and, thus, are suitable for use in electrophotography.

13 Claims, 3 Drawing Figures

+VE POTENTIAL
1. 100% POLYVINYLCARBAZOLE
2. 50/50 N-VINYLCARBAZOLE/N-VINYLPHTHALIMIDE
3. 75/25 N-VINYLCARBAZOLE/N-VINYLPHTHALIMIDE

INCIDENT PHOTON FLUX: $1.4 \times 10^{14}$ PHOTONS/cm² AT 4700Å
ACTION SPECTRA NORMALIZED TO EQUAL INCIDENT PHOTONS
FILM THICKNESS: 14μ; AREA 1.7 cm²
SEMITRANSPARENT CHROMIUM ELECTRODES

COPOLYMERS OF N-VINYLCARBAZOLE AND N-VINYLPHTHALIMIDE AND DERIVATIVES THEREOF

This is a division of application Ser. No. 342,646, filed Mar. 19, 1973, now U.S. Pat. No. 3,877,936.

BACKGROUND OF THE INVENTION

1. Field of the Invention

This invention relates to polymeric compositions and the use of many of these compositions in electrophotographic elements and processes. More specifically, this invention involves random copolymers, many of which are photoconductive and, thus, suitable for use in electrophotographic imaging members and processes. The spacial constraint and relative conformation of the functional groups of the two principal components of these compositions apparently favors a charge transfer interaction between them.

2. Description of the Prior Art

The formation and development of images on the imaging surfaces of photoconductive materials by electrostatic means is well known. The best known of the commercial processes, more commonly known as xerography, involves forming a latent electrostatic image on an imaging surface of an imaging member by first uniformly electrostatically charging the surface of the imaging layer in the dark and then exposing this electrostatically charged surface to a light and shadow image. The light struck areas of the imaging layer are thus rendered conductive and the electrostatic charge selectively dissipated in these irradiated areas. After the photoconductor is exposed, the latent electrostatic image on this image bearing surface is rendered visible by development with a finely divided colored electroscopic material, known in the art as "toner". This toner will be principally attracted to those areas on the image bearing surface which retain the electrostatic charge and thus form a visible powder image.

The developed image can then be read or permanently affixed to the photoconductor where the imaging layer is not to be reused. This latter practice is usually followed with respect to the binder-type photoconductive films (e.g. ZnO) where the photoconductive imaging layer is also an integral part of the finished copy.

In so-called "plain paper" copying systems, the latent image can be developed on the imaging surface of a reusable photoconductor or transferred to another surface, such as a sheet of paper, and thereafter developed. When the latent image is developed on the imaging surface of a reusable photoconductor, it is subsequently transferred to another substrate and then permanently affixed thereto. Any one of a variety of well known techniques can be used to permanently affix the toner image to the copy sheet, including overcoating with transparent films, and solvent or thermal fusion of the toner particles to the supportive substrate.

In the above "plain paper" copying system, the materials used in the photoconductive layer should preferably be capable of rapid switching from insulative to conductive to insulative state in order to permit cyclic use of the imaging surface. The failure of a material to return to its relatively insulative state prior to the succeeding charging sequence will result in a decrease in the maximum charge acceptance of the photoconductor. This phenomenon, commonly referred to in the art as "fatigue", has in the past been avoided by the selection of photoconductive materials possessing rapid switching capacity. Typical of the materials suitable for use in such a rapidly cycling system include anthracene, sulfur, selenium and mixtures thereof (U.S. Pat. No. 2,297,691); selenium being preferred because of its superior photosensitivity.

In addition to anthracene, other organic photoconductive materials, most notably, poly(N-vinylcarbazole), have been the focus of increasing interest in electrophotography. Most organic photoconductive materials, includng poly(N-vinylcarbazole), lack the inherent photosensitivity to be competitive with selenium. This need for the enhancement of the photoresponse characteristics of organic photoconductors thus led to the formulation of these organic materials with other compounds, commonly referred to as "activators". Poly(vinylcarbazoles), for example, when sensitized with 2,4,7-trinitro-9-fluorenone exhibit good photoresponse and discharge characteristics and, (depending upon the polarity of the surface charge), low dark decay; U.S. Pat. No. 3,484,237. Other organic resins, traditionally considered nonphotoconductive can also be sensitized with certain activators, such as Lewis Acids, thus forming charge transfer complexes which are photoresponsive in the visible band of the spectrum, U.S. Pat. Nos. 3,408,181; 3,408,182; 3,408,183; 3,408,184; 3,408,185; 3,408,186; 3,408,187; 3,408,188; 3,408,189; and 3,408,190. With respect to both the photoconductive and nonphotoconductive resins, the degree of sensitization is generally concentration dependent; the higher the loadings of activators, the greater the photoresponse.

The concentration of activator capable of formulation with the above materials, however, is finite; generally being limited to less than 10 weight percent of the composition. Ordinarily, the addition of high loadings of activator to many of the above materials will lead to impairment of mechanical and/or the photoconductive properties of the sensitized composition. In most instances, the excessive addition of activators to both the photoconductive and nonphotoconductive materials of the types disclosed in the above patents will result in crystallization of these activators, thus impairing the mechanical strength and other physical properties of the resultant photo conductive composition. Still yet other sensitizers, when present in relatively low concentration can result in over sensitization of the composition in that the photocurrent generated upon exposure will persist long after illumination ceases, BUL. CHEM. SOC. of JAP. 39: 1660 – 1670 (1966). This phenomenon prevents the further use of such materials for preparation of successive electrostatic reproductions until such persistent conductivity is dissipated in the previously illuminated areas of the photoconductor. The dissipation of persistent photocurrents generally takes an extended period of time and/or thermal erasure, thus making these oversensitized compositions generally unsatisfactory for rapid cycling electrostatographic imaging systems.

As an alternative to the more traditional type of sensitization discussed above, Inami and Morimoto have proposed preparation of "intramolecular" charge transfer complexes wherein the electron donor and electron acceptor functions are located along a common vinyl backbone, U.S. Pat. No. 3,418,116. The materials of principal interest disclosed in the above patent are the nitrated vinyl polymers of polyacenaphthylene, poly-9-vinylcarbazole and poly-1-vinylnaphthalene. More recently, Podhajny has proposed his own "intramolecular" type charge transfer complex system wherein the electron donor and electron acceptor functions are contributed by 3,6-diphenyl-vinylcarbazole and 3,6-dinitrovinylcarbazole, respectively; U.S. Pat. No. 3,697,264. A more in depth treatment of this type of charge transfer complex system is offered by Breen and Keller, J. Am. Chem. Soc. 90, 1935, (1968). It is thought that the spacial constraint placed upon the electron donor and electron acceptor functions enhances the probability of charge transfer interaction. In addition, certain conformational and steric requirements must also be satisfied in order to facilitate efficient overlap of donor and acceptor electron orbitals required of this type of charge transfer interaction.

It is, thus, the object of this invention to provide polymeric compositions wherein the structural units thereof are from at least two vinyl monomers, one having an electron donor and a second having an electron acceptor function. More specifically, the principal object of this invention is to provide a photoconductive composition having an electron donor and an electron acceptor function.

It is another object of this invention to provide a photoconductive composition wherein the electron donor and electron acceptor functions are arranged along a common polymeric backbone.

It is yet another object of this invention to provide a photoconductive composition wherein the electron donor and electron acceptor functions are arranged along a common polymeric backbone in such a fashion as to favor "intramolecular" charge transfer complex formation.

SUMMARY OF THE INVENTION

The above and related objects are achieved by providing a polymeric composition comprising structural units from (i) N-vinylcarbazole and (ii) at least one member selected from the group consisting of N-vinylphthalimide and the isostructural modifications thereof. Since the principal area of proposed utility of the above composition resides in the electrophotographic arts, the preferred compositions are photoconductive; the carbazole moiety providing the electron donor function and the phthalimide moiety providing the electron acceptor function. These preferred copolymers will generally contain from about 50–90 mole percent structural units from N-vinylcarbazole and from about 10 to about 50 mole percent structural units from N-vinylphthalimide.

DESCRIPTION OF THE INVENTION

Figure 1:
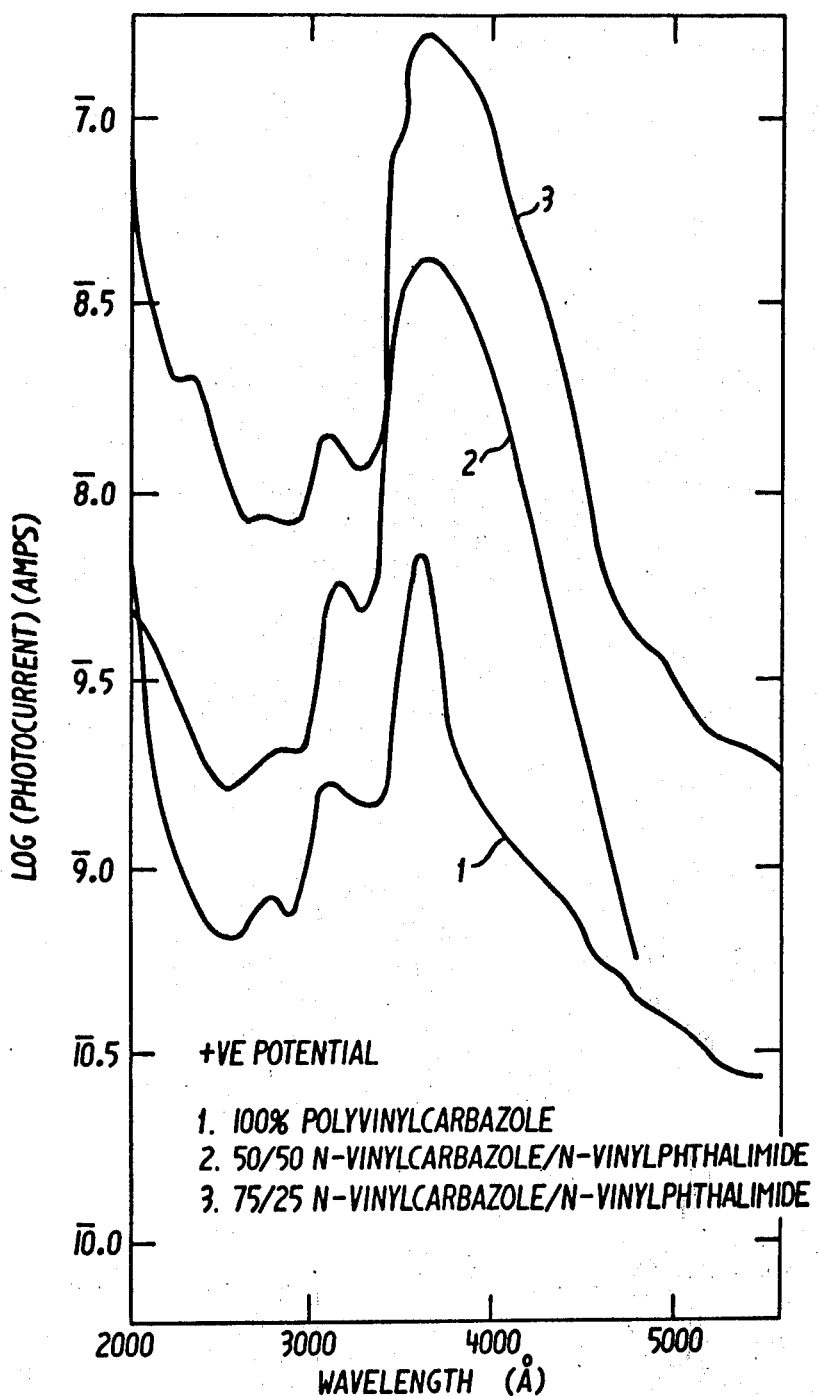
FIG. 1 is a graphic illustration of the log of photocurrent vs. wavelength applied light for two of the copolymers of this invention and poly-N-vinylcarbazole. In each instance, the photoresponse was measured under an applied positive potential.

Preliminary to preparation of the random copolymers of this invention, the vinyl monomers should preferably be purged of impurities. With respect to N-vinylcarbazole, this is achieved by vacuum sublimation, or by recrystallization of this monomer from methanol under nonoxidizing conditions. The N-vinylphthalimide monomer can be purified by passing a benzene solution thereof through a Woelm neutral aluminua column, followed by recrystallization from benzene. Subsequent to recovery of the above purified monomers they can be formed into the polymeric compositions of this invention by standard free radical initiated addition polymerization techniques. It is generally preferred that the above monomers be reacted with one another under conditions which favor formation of copolymers having substantially the same mole ratio with respect to its structural units as the concentration of monomers in the charge.

In a representative embodiment of this invention, a copolymer containing about 9 mole percent structural units from N-vinylphthalimide and about 91 mole percent structural units from N-vinylcarbazole can be prepared according to the following procedure. About 0.866 grams (0.005 moles) of N-vinylphthalimide and 9.16 grams (0.05 moles) of N-vinylcarbazole are dissolved in 25 milliliters anhydrous benzene. The monomer solution is then transferred to a 50 milliliter polymer tube. A free radical initiator, such as azobisisobutyronitrile, is then introduced into the solution. Generally about 0.03 grams ($1.8 \times 10^{-4}$ moles) initiator is adequate to facilitate substantially complete copolymerization of the two monomeric materials. After addition of the initiator, the monomer solution is degassed three times by conventional freeze-thaw methods and then the tube sealed under a vacuum. The sealed polymer tube is then placed in a constant temperature bath at 75°C and allowed to remain there for about 12 hours. During this interval, the contents of the tube develop a yellowish color. The tube is then removed from the constant temperature bath, cooled, the seal broken and the polymeric product separated from the reaction medium by precipitation with hexane. This precipitation is generally carried out by continuous agitation of the hexane-polymer slurry in a Waring blender. Once separated, the crude polymeric product is purified by redissolving it in a minimum amount of a mixture of benzene/tetrahydrofuran (1:2 by volume) and then reprecipitated from hexane. The recovered polymeric solids are then redissolved and precipitated as described above three additional times. The polymer solids thus produced have a pale yellow tint and display a yellow-green fluorescence when observed under ultraviolet light. Prior to further analysis, the polymer solids are dried overnight in a vacuum oven at about 70°C. Further analysis of the polymeric solids indicates that the relative concentration of carbazole and phthalimide functional units of the copolymer are substantially the same as the gross mole composition of the monomer charge. Molecular weight determinations were made by standard vapor pressure osmometry techniques and indicate that the polymeric product has a number average molecular weight of 100,000.

Additional polymeric compositions were prepared according to the above technique from monomer charges containing one mole percent N-vinylphthalimide and 99 mole percent N-vinylcarbazole; 25 mole percent N-vinylphthalimide and 75 percent N-vinylcarbazole; 50 mole percent N-vinylphthalimide and 50 mole percent N-vinylcarbazole; 75 percent N-vinylphthalimide and 25 mole percent N-vinylcarbazole; and 99 percent N-vinylphthalimide and one mole percent N- vinylcarbazole. Generally, the polymeric compositions thus prepared substantially reflected the relative concentration of the individual monomers in the charge. Other physical properties were also substantially the same as that reported for the above described composition.

Figure 3:
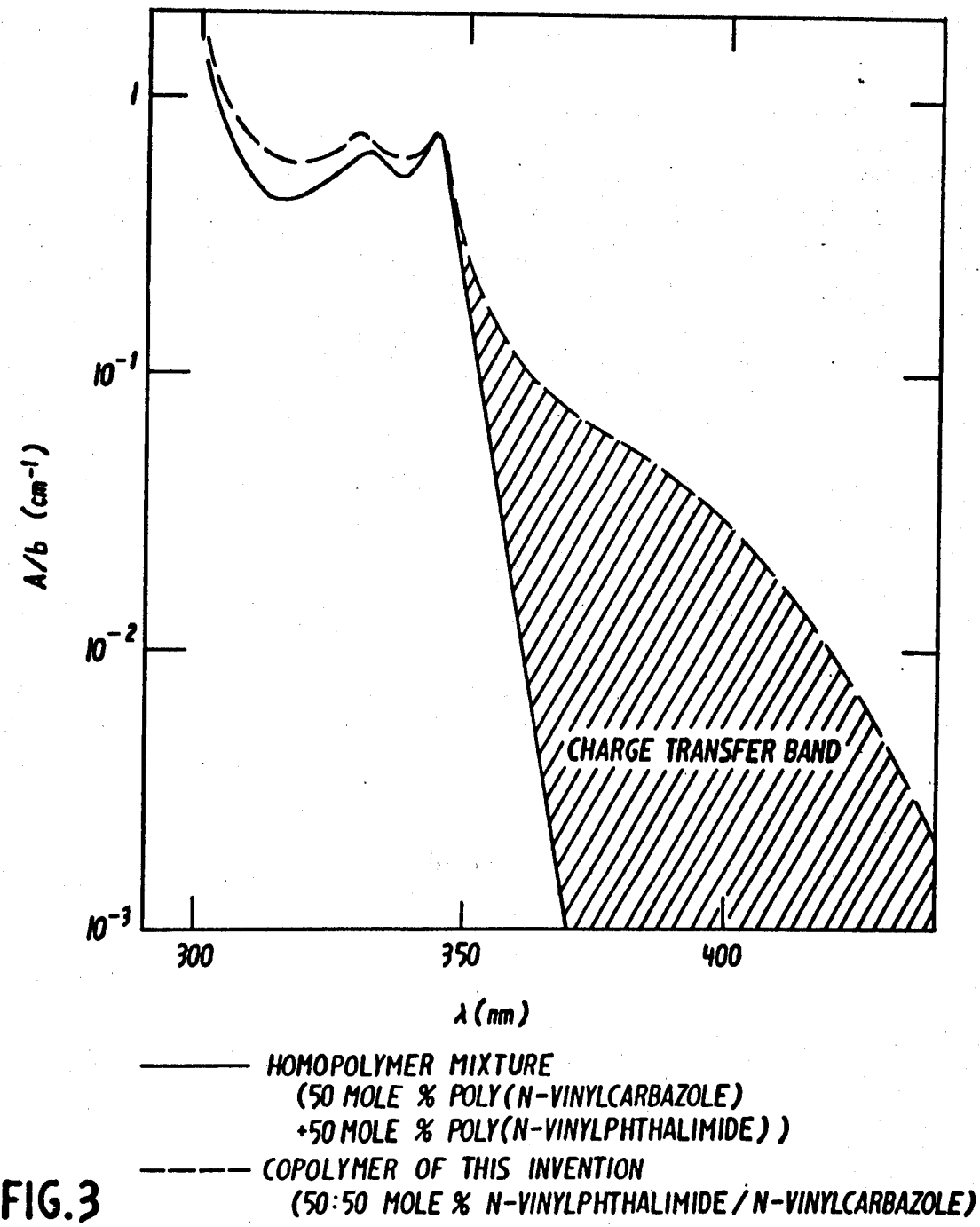
FIG. 3 is a graphical illustration of the charge transfer band of the preferred photoconductive composition of this invention.

The above polymeric products are subjected to spectral analysis on a Cary 14R Spectrophotometer at room temperature. A series of solutions were prepared from these polymeric products and homopolymers of poly-N-vinylcarbazole and poly-N-vinylphthalimide. Spectral grade methylene chloride was used as the solvent in all instances. All the copolymeric materials exhibited a broad charge transfer band at 360 nanometers. A similar charge transfer band was not observed from a solution containing a mixture of the homopolymers. The most significant feature of these spectra is the unusually high intensity of the charge transfer band exhibited by these copolymer samples. This intensity is assumed to be a function of the high concentration of the charge transfer complex in solution brought about by the forced interaction between adjacent donor and acceptor sites on the common polymeric backbone. This difference in electronic properties is illustrated graphically by FIG. 3. The intensity of this band remained unchanged even where solvents of different dielectric constants were used. All the evidence, thus, supports the assumption that this broad charge transfer band is predominently attributable to a nondissociable intramolecular intereaction. That is to say that charge transfer interaction is taking place predominently within the diads formed by adjacent donor and acceptor sites on common polymeric strands.

The above polymeric compositions can be formed into photoconductive films useful in electrophotography by simple solvent casting and coating techniques. For example, an imaging member useful in electrophotography can be prepared from the polymeric compositions of this invention by draw coating a 20 weight percent solution of one of the above compositions on an aluminized Mylar substrate. Typical of the solvents which can be used as the vehicle in such a draw coating process are tetrahydrofuran and mixtures of toluene-cyclohexanone (40:60 by volume). The film thickness is controlled by adjustment of the viscosity of the coating solution and/or by mechanical means. A photoconductive layer prepared as thus described should have a thickness in the range of from about 5 to about 50 microns in order to be suitable for use in an electrophotographic imaging member. In addition to the aluminized Mylar substrate, any conductive substrate traditionally used in electrophotography will provide a suitable ground plane for the photoconductive imaging layer. In addition, a barrier layer may, if desired, be interfaced between the photoconductive layer and the conductor substrate in order to further reduce the rate of dark decay of the imaging member. Any of the organic or inorganic materials disclosed in Dessauer, U.S. Pat. No. 2,901,348 can be used as the material for this barrier layer.

In order to determine the relative photoconductive behavior of the various compositions of this invention, a series of electrophotographic imaging members are prepared as described above. The thickness of the photoconductive imaging layer is about 15 microns. In addition to imaging members prepared from the various compositions of this invention, an additional imaging member is prepared from a homopolymer of poly-N-vinylcarbazole. In each instance, the imaging member is corona charged in the dark to a positive potential of about 600 volts and then exposed continuously to white light from a 200 watt tungsten-iodine lamp from a distance of 15 centimeters. In each instance the time required to fully discharge the plate is noted. This experiment is repeated, except that the plate is now charged to a negative potential of about 600 volts, the plate illuminated and the time required to completely discharge the surface potential also noted. The data collected indicates that the imaging member having a photoconductive layer comprising about 1 mole percent structural units from N-vinylphthalimide and 99 mole percent structural units from N-vinylcarbazole fully discharges a positive charge in about ⅓ the time required to fully discharge a negative charge. The imaging members having a photoconductive layer comprising from about 10 to about 50 mole percent structural units from N-vinylphthalimide are capable of complete discharge of both positive and negative potentials in substantially the same times. In all instances, the time required to discharge the imaging members having photoconductive layers prepared from the compositions of this invention were substantially less than the time required to discharge the imaging member having a photoconductive layer of poly-N-vinylcarbazole.

The imaging members are then further evaluated in order to determine the initial rate of discharge of the photoconductive layer under continuous white light illumination. The result of this evaluation is summarized in the Table presented below:

TABLE I

| Mole Percent N-vinylcarbazole | Initial charge potential in volts | $dv/dt_{(t=0)}$ in volts per second per micron of film thickness |
| --- | --- | --- |
| 100 | + 600 | 6 |
|  | − 600 | 1 |
| 99 | + 1200 | 34 |
|  | − 1300 | 14 |
| 75 | + 1200 | 85 |
|  | − 1300 | 67 |
| 50 | + 1200 | 65 |
|  | − 1300 | 27 |
| 1 | + 1200 | 1 |
|  | − 1300 | 1 |

(Light sorce: continuous tungsten-iodine, 1.3 watts per square centimeter.)

Figure 2:
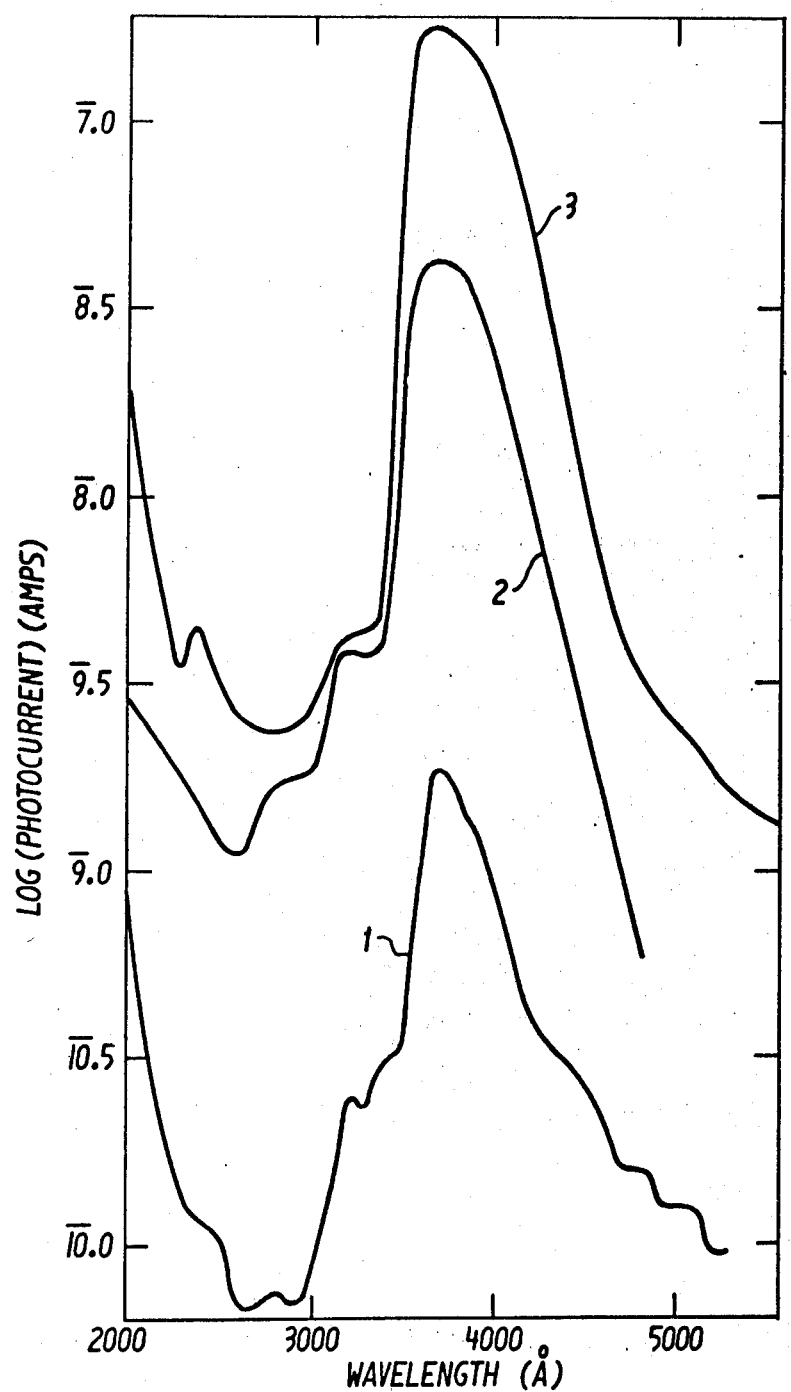
FIG. 2 is a similar graphical illustration of photocurrent vs. wavelength for these same compositions when under an applied negative potential.

Two of the imaging members previously tested are now further evaluated with regard to their photoresponse at different wavelengths. For comparison purposes, the action spectra of the imaging member having a photoconductive layer of poly-N-vinylcarbazole has also been included. FIG. 1 provides the action spectrum for all three of these imaging members when placed under an applied positive potential. FIG. 2 provides a similar basis for comparison when these same imaging members are under an applied negative potential. The maximum photoresponse of all three of the compositions appears at a wavelength of about 3680 A; however, only the imaging members having photoconductive layers prepared from the compositions of this invention tail off well into the visible portion of the spectrum. A comparison of FIGS. 1 and 2 would appear to indicate that these two compositions operate fairly independent of the polarity of the applied potential. It is also apparent that the magnitude of the photocurrent is related to the relative concentration the electron donor and electron acceptor moieties on the polymeric backbone. Maximum photosensitivity is experienced when the copolymer composition comprises about 25 mole percent of structural units from N-vinylphthalimide and about 75 mole percent of structural units from N-vinylcarbazole, and thus this copolymeric material is preferred.

In addition to the specific compositions discussed previously, a number of isostructural modifications of the electron acceptor moiety of the copolymer are possible without sacrifice of the photoconductivity of the copolymer. In general, such modifications are made by effecting substitution of the electron acceptor moiety of the preformed polymeric composition of this invention. This is achieved by quantitative detachment of the phthalimide group from the copolymer by subjecting the polymer to hydrazine. The equations which follow are typical of such isostructural modification.

centimeters from the surface of the film. The Model D is also outfitted with an electrometer and a potentiometric pen recorder for graphic documentation of the voltage-time discharge behavior.

The examples which follow further define, describe and illustrate preparation and use of the polymeric compositions of this invention. Conditions and apparatus not specifically set forth in these specific embodiments are presumed to be standard or as hereinbefore described. Parts and percentages appearing in such examples are by weight unless otherwise indicated.

EXAMPLE I

Preparation of vinylamine/N-vinylcarbazole copolymer 3.6 grams of a random copolymer of N-vinylphthalimide/N-vinylcarbazole (9.2/90.8 mole percent)

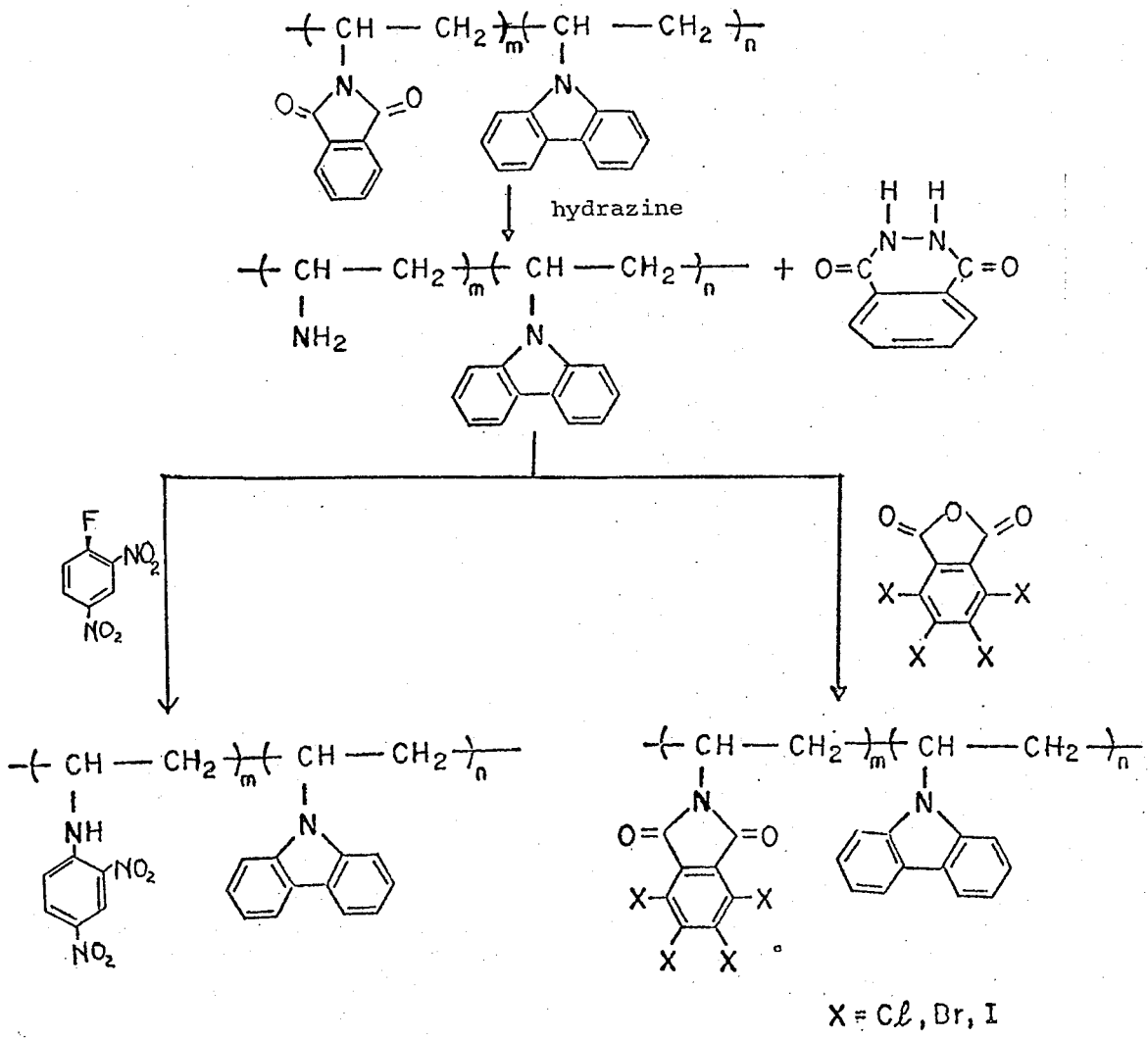

The photoconductive characteristics of films prepared from these polymeric products are evaluated on a Xerox Model D Copier equipped with a 100 Watt tungsten lamp (and shutter) located at a distance of 25 are dissolved in a solution containing 100 milliliters of tetrahydrofuran and 10 milliliters of ethanol. After the copolymer has been dissolved, 0.13 grams hydrazine hydrate (85%) were added and the solution thereafter heated to boiling under refluxing conditions overnight. At the end of this interval, the solution apparently remains unchanged, it retaining its characteristic yellow color. An additional 2.6 grams of hydrazine hydrate are then added and the solution refluxed for an additional two days. At the end of this time, the characteristic yellow color of the solution has disappeared and a white precipitate formed. The solution is now allowed to cool to room temperature and the precipitate removed by filtration. This precipitate is believed to be phthalhydrazide. The polymer is separated from the solution by precipitation with hexane in a Waring blender. The number average molecular weight of the polymeric product is about 78,000.

EXAMPLE II

The procedure of Example I is repeated except for the substitution of a copolymer comprising about 25 mole percent structural units from N-vinylphthalimide and about 75 mole percent structural units from N-vinylcarbazole.

EXAMPLE III

A series of copolymers were prepared by condensing the amino group of the vinylamine/N-vinylcarbazole copolymer with tetrahalophthalic anhydrides.

N-vinyltetrahalophthalimide/N-vinylcarbazole copolymers can be prepared by combining 0.45 grams of a copolymer comprising vinylamine/N-vinylcarbazole (9.2/90.8 mole percent) and about 0.001 mole of tetrahalophthalic anhydride in 100 milliliters of cyclohexanone. This solution is prepared in a 250 milliliter flask equipped with a magnetic stirring bar and reflux condenser. After the above ingredients are dissolved, a few drops of triethylamine catalyst are added to the solution and the contents of the flask heated to boiling under reflux conditions. Heating continuous for a period of about 2 days, after which time the colorless solution will take on a yellow, yellow-orange, orange or light red color depending upon the anhydride in the solution. The solution is now allowed to cool to room temperature, and the polymer separated by precipitation from methanol in a Waring blender. Where the polymer forms a fine flocculent, separation may require centrifugation. The various isostructural modifications of N-vinylphthalimide/N-vinylcarbazole exhibit maximum absorption at about 350 nanometers and tail off well into the visible band of the spectrum.

EXAMPLE IV

Preparation of N-vinyl-2,4-dinitroaniline/N-vinylcarbazole copolymer 1 gram of a copolymer comprising vinylamine/N-vinylcarbazole (25/75 mole percent) is dissolved in 50 milliliters of anhydrous dimethylformamide (DMF). 0.184 grams potassium carbonate is then suspended in this polymer solution and thereafter 1 milliliter of 2,4-dinitrofluorobenzene (Sanger's reagent) added by dropwise addition. Immediately after the addition of Sanger's reagent a yellow color develops within the solution and becomes more intense as the reaction proceeds. The flask containing the solution is then heated over a steam bath for about 1½ hours at which time the polymer precipitated from the DMF by the addition of water. The precipitate is separated from the solution by filtration and purified by washing with warm dilute aqueous potassium hydroxide solution. This washing procedure is repeated several times until the filtrate is colorless. The polymer is then dried in a vacuum oven at about 70°C. The number average molecular weight of the product is in the range of about 100,000.

EXAMPLE IV

Preparation of N-vinyl-4-nitroaniline/N-vinylcarbazole copolymer

About 1.5 grams of polymer comprising vinylamine/N-vinylcarbazole (25/75 mole percent) is dissolved in 50 milliliters of dimethyl formamide (DMF). The reaction vessel containing this solution is purged of air with nitrogen and the remainder of the reaction carried out under this nitrogen blanket. About 0.27 grams potassium carbonate is suspended in this solution and thereafter one milliliter of 1-fluoro-4-nitrobenzene added by dropwise addition. The resulting mixture is heated over a steam bath for about 22 hours, the polymer precipitated from the DMF by the addition of about 200 milliliters of water, and the precipitate separated from the solution of filtration. In order to assist in the separation of the polymer from the solution, a small amount of ammonium chloride was added to assist in coagulation of the polymer. The isolated polymer is washed repeatedly with dilute aqueous sodium hydroxide and then dried in a vacuum oven at about 40°C. The number average molecular weight of the polymeric composition is in the range of about 93,000.

EXAMPLE VI

The procedures of Example VI and V are repeated except for the use of a copolymer comprising 9.2 mole percent structural units of vinylamine and 90.8 mole percent structural units of N-vinylcarbazole.

A number of polymeric compositions of the previous examples are evaluated with respect to their photoconductivity by first forming them into an imaging layer on an aluminized Mylar substrate as previously described and then subjecting the resulting imaging member to standard electrophotographic analysis.

Table II which follows provides the results of such evaluation.

Table II

| | Initial potential in volts | $dv/dt_{(t=0)}$ involts per second per micron of film thickness | Residual potential in volts |
|---|---|---|---|
| Poly N-vinyl-tetrachlorophthalimide/ N-vinylcarbazole (25/75 mole %) | +930 <br> −780 | 30 <br> 23 | 150 <br> 150 |
| Poly N-vinyl-tetrabromophthalimide/ N-vinylcarbazole (25/75 mole %) | +1050 <br> −680 | 7.3 <br> 1.9 | 220 <br> 150 |

Table II-continued

| | Initial potential in volts | $dv/dt_{(t=0)}$ in volts per second per micron of film thickness | Residual potential in volts |
|---|---|---|---|
| Poly N-vinyl-tetraiodophthalimide/ N-vinylcarbazole (25/75 mole %) | + 570<br>− 540 | 0<br>0 | 570<br>540 |
| Poly N-vinyl-4-nitro-aniline/N-vinylcarbazole (25/75 mole %) | + 800 | 0 | 800 |
| Poly N-vinyl-2,4-dinitro-aniline/N-vinylcarbazole (25.75 mole %) | + 540<br>− 540 | 6.4<br>4.1 | 150<br>150 |
| Poly N-vinylphthalimide/ N-vinylcarbazole (25/75 mole %) | + 1200<br>− 1300 | 85<br>65 | 30<br>30 |
| Polyvinylcarbazole | + 600<br>− 600 | 6.0<br>1.0 | 100<br>350 |

(Light source: continuous tungsten-iodine, 1.3 watts per square cm.)

It, thus, appears that not all isostructural modifications of the N-vinylphthalimide/N-vinylcarbazole copolymer are photoconductive. Apparently the conformation of the modified materials as well as the subtle electrical differences of the substituent groups tend to prevent the type of intramolecular charge transfer interaction exhibited by their photoconductive counterparts.

What is claimed is:

1. A copolymer which comprises structural units from N-vinylcarbazole and N-vinylphthalimide.

2. The copolymer of claim 1 wherein said copolymer contains from about 10 to about 50 mole percent structural units from N-vinylphthalimide.

3. The copolymer of claim 1 wherein said copolymer contains from about 25 to about 50 mole percent structural units from N-vinylphthalimide.

4. A photoconductive copolymer comprising structural units from (i) N-vinylcarbazole and (ii) N-vinylphthalimide.

5. The photoconductive copolymer of claim 4, having from about 10 to about 50 mole percent structural units from N-vinylphthalimide.

6. The photoconductive copolymer of claim 4, having from about 25 to about 50 mole percent structural units from N-vinylphthalimide.

7. A photoconductive copolymer comprising structural units from (i) N-vinylcarbazole and (ii) chloro-substituted N-vinylphthalimide.

8. The photoconductive copolymer of claim 7, comprising structural units from N-vinyltetrachlorophthalimide and N-vinylcarbazole.

9. A photoconductive copolymer comprising structural units from (i) N-vinylcarbazole and (ii) bromo-substituted N-vinylphthalimide.

10. The photoconductive copolymer of claim 9, comprising structural units from N-vinyltetrabromophthalimide and N-vinylcarbazole.

11. The photoconductive copolymer of claim 9, comprising structural units from N-vinyl-2,4-dinitro-aniline and N-vinylcarbazole.

12. A photoconductive copolymer comprising structural units from (i) N-vinylcarbazole and (ii) iodo-substituted N-vinylphthalimide.

13. A photoconductive copolymer comprising structural units from (i) N-vinylcarbazole and (ii) nitro-substituted N-vinylaniline.

* * * * *

UNITED STATES PATENT AND TRADEMARK OFFICE
CERTIFICATE OF CORRECTION

PATENT NO. : 3,970,602
DATED : July 20, 1976
INVENTOR(S) : William W. Limburg and Donald A. Seanor It is certified that error appears in the above-identified patent and that said Letters Patent are hereby corrected as shown below:

Column 2, line 45, delete "photo conductive" and insert ---photoconductive---.

Column 9, line 37, delete "continuous" and insert ---continues---.

Column 10, line 19, delete "Example IV" and insert ---Example V---.

Column 11, 10th line of Table II, delete "(25.75 mole %)" and insert ---(25/75 mole %)---.

Signed and Sealed this

Thirtieth Day of November 1976

[SEAL]

Attest:

RUTH C. MASON
*Attesting Officer*

C. MARSHALL DANN
*Commissioner of Patents and Trademarks*